United States Patent [19]

Kahn

[11] 4,137,633

[45] Feb. 6, 1979

[54] ROOT CANAL PRACTICE MODEL

[76] Inventor: Henry Kahn, 1724 Grand Bahama West, Palm Springs, Calif. 92262

[21] Appl. No.: 792,694

[22] Filed: May 2, 1977

[51] Int. Cl.² ............................................. G09B 23/28
[52] U.S. Cl. .................................................. 32/71
[58] Field of Search ............................................. 32/71

[56] References Cited

U.S. PATENT DOCUMENTS

| 1,048,382 | 12/1912 | Allen | 32/71 |
| 2,750,670 | 6/1956 | Vigg | 32/71 |
| 3,947,967 | 4/1976 | Satake | 32/71 |

*Primary Examiner*—Louis G. Mancene
*Assistant Examiner*—John J. Wilson

[57] ABSTRACT

A practice model to simulate a typical root canal of a human tooth for use in teaching the student the art of endodontia.

2 Claims, 3 Drawing Figures

ROOT CANAL PRACTICE MODEL

BACKGROUND OF THE INVENTION

The technique of operating on a root canal as referred to the anatomy of a human tooth involves, among other steps, thorough elimination of all vestiges of the nerve structure and pulp prior to filling the canal. This cleansing step is performed by using so-called files having various transverse cross sections, working lengths and configurations, i.e. straight or arcuate. By providing the student with a model or models which have simulated versions of the root canal, and an adequate assortment of files, practice may be acquired in the proper techniques.

One form of simulated tooth and canal is disclosed in U.S. Pat. No. 3,947,967, dated Apr. 6, 1976, to which reference is made for details common to said patent and the present application.

SUMMARY OF THE INVENTION

The present invention comprises a block of transparent plastic composition such as those commercially referred to as epoxy having good transparency and machinability. The block is cast around a pattern tapered in the manner of a standard root canal file, having either a straight or curved axis, as desired, and a transverse cross section, usually circular, corresponding approximately to that of the human canal.

It is preferred also to simulate the soft tissue or periodontal membrane at the bottom of the canal by means of a block of simulated pulp of spongy character whereby the student can sense the yieldable impediment marking the inner limit of the canal and thus to enable regulation of the stroke of the file accordingly.

As disclosed in the said patent the lateral exterior faces of the block simulating the tooth, are mutually perpendicular to minimize errors due to refraction through the transparent material as the student views his work.

The present invention has, for its principal object, a model for the purpose stated which incorporates a resilient pad or bumper at the inner extremity of the canal against which the file may "bottom" during its reciprocation to provide a tactile limit to the inward stroke of the file as well as visual indication of the condition of the pulp as filing proceeds.

DESCRIPTION OF THE PREFERRED EMBODIMENT

Figure 1:
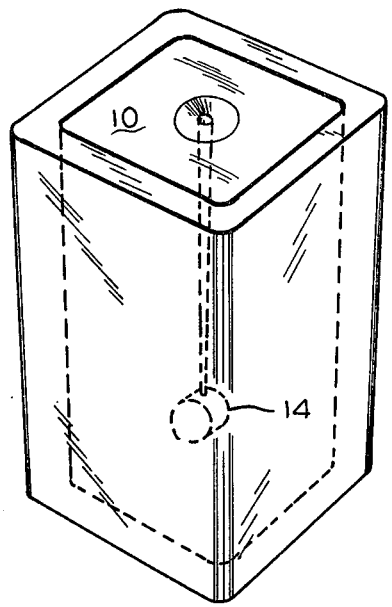
FIG. 1 is an isometric view of the practice block of the invention as seen in a phase of fabrication.

In a preferred form, the device of the invention comprises a block 10 cast from a transparent resin, e.g. an epoxy, characterized by good machinability, and a hardness substantially the same as natural dentine.

The block 10 is desirably cast in a mold although other processes may be used. A preferred method of manufacture includes the following:

Extruded silicone rod is cured and cut into plugs 14, each being thrust on to the pointed end of a tapered form or pattern 16 having a smooth lateral face. A pan of softened wax is prepared. The butt end of the pattern is pressed into the wax. At this time provision is made for a well 9 at the entrance to what will subsequently be the simulated canal. This simulates the pulp chamber in the natural tooth which merges with the root canal. The well, in the finished product, constitutes a reservoir for a lubricant to flush the filings from the simulated canal as work proceeds. The well is realized by providing the reverse of a conical cup in the wax. In effect, the conical formation will be part of the pattern around which the epoxy resin will be poured. The plug and pattern on which it is impaled, is pressed into the wax until a distance of from about 18-20 mm is achieved between the wax and plug. The wax is then softened further and a short piece 17 of square tubing of an acrylic or similar transparent plastics material is pressed over the broach-plug assembly. The tubing is pressed well down into the wax to insure against leakage of the epoxy resin.

The epoxy resin is poured into the acrylic tubing to cover the pattern and is then allowed to harden. After hardening, the assembly, including the pattern is withdrawn from the wax. To insure clean stripping a conventional silicone release fluid is sprayed on the pattern beforehand.

Figure 2:
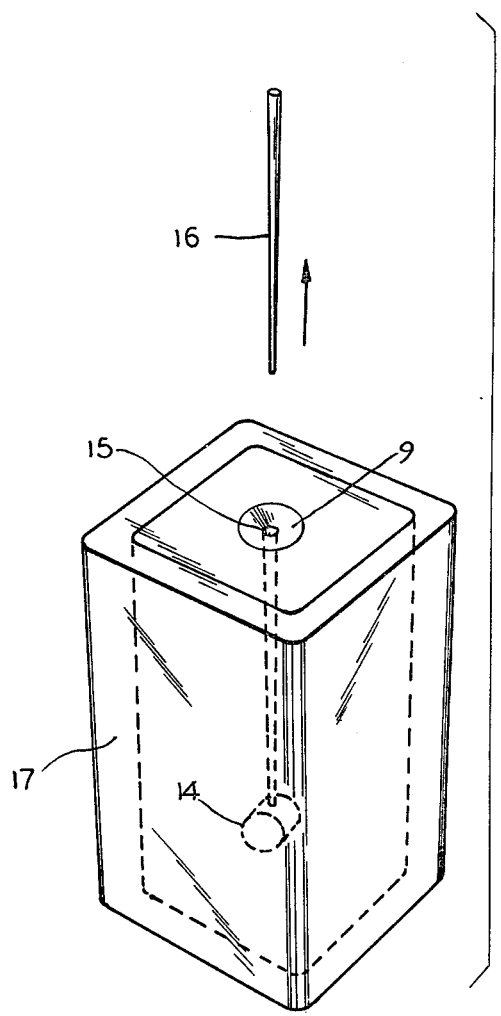
FIG. 2 is a view similar to FIG. 1 showing the molded block with the pattern withdrawn.
Figure 3:
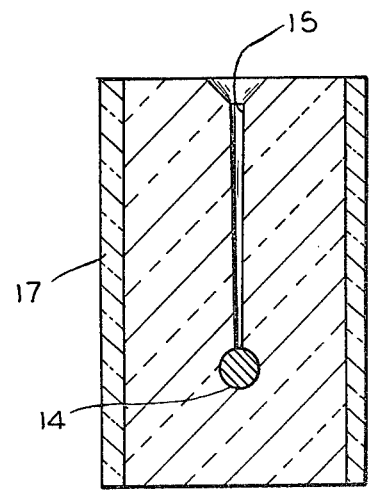
FIG. 3 is a cross section of the block taken in a vertical, medial plane through its central axis.

After the epoxy has hardened the pattern is then gripped with needle-nose pliers and the pattern 16 is stripped, using a combined pulling and twisting motion. The resulting bore in the block 10 is indicated at 15. What remains is seen in FIGS. 2 and 3.

Both end faces of the mold and casting are sanded if desired to reduce reflections within the finished device. The lateral faces of the mold are polished to increase transparency.

From the foregoing it will have become apparent that the device provides a more or less exact counterpart of a root canal as found in connection with a human tooth before enlargement by filing. The student may practice with the regular files and, at the same time, see exactly the results of his manipulation, a process not possible by using a human tooth or a replica thereof. By the use of variously curved files and correspondingly shaped counterparts in a transparent block, practice is easily obtained.

Any tendency on the part of the student to overdrive the file is avoided since overdrive is sensed by impact of the tip of the file on the plug 14 which provides a cushioned reaction feeding an impulse back to the student's fingers, thus enabling him to adjust his stroke accordingly.

The device is simple and inexpensive so that the student may provide himself with a practice kit consisting of assorted combinations of files suitable for operating on curved and straight canals at moderate expense. It will be understood that, since the student will be constantly enlarging the bore 15 the device has a rather limited life and should be regarded as expendable.

It will be understood that, in nature, root canals vary in configuration along their length, being essentially straight, curved or meandering. Furthermore, it is noted that the canal or canals may be branched with two, and sometimes three branches. Consequently, the files required by the student are correspondingly configured to perform their function in the most efficacious way.

I claim:

1. In a device useful in the study of endodontia which comprises a block of transparent, machinable material, having a top face and a bottom end and a tapered cavity extending inwardly of said top face, the larger end of the cavity opening at said top face to receive a root canal file for reciprocating movement therein the improvement which comprises a resilient mass located and held solely at the bottom end of the cavity providing a cushioned stop resiliently limiting the inward stroke of the file during reciprocation thereof to simulate, through the student's tactile sense, the periodontal membrane of a natural tooth.

2. The combination in accordance with claim 1 wherein the stop comprises a silicone resin.

* * * * *